United States Patent
Smith

(10) Patent No.: US 9,992,087 B2
(45) Date of Patent: Jun. 5, 2018

(54) SYSTEM AND METHOD FOR LONG RANGE WIRELESS LOCAL AREA NETWORK COMMUNICATIONS

(71) Applicant: SR Technologies, Inc., Davie, FL (US)

(72) Inventor: Graham K. Smith, Boca Raton, FL (US)

(73) Assignee: SR Technologies, Inc., Davie, FL (US)

( * ) Notice: Subject to any disclaimer, the term of this patent is extended or adjusted under 35 U.S.C. 154(b) by 71 days.

(21) Appl. No.: 15/150,814

(22) Filed: May 10, 2016

(65) Prior Publication Data
US 2016/0337219 A1 Nov. 17, 2016

Related U.S. Application Data

(60) Provisional application No. 62/162,098, filed on May 15, 2015.

(51) Int. Cl.
| | |
|---|---|
| H04L 1/08 | (2006.01) |
| H04L 12/26 | (2006.01) |
| H04L 1/16 | (2006.01) |
| H04W 24/08 | (2009.01) |
| H04L 29/06 | (2006.01) |
| H04W 84/12 | (2009.01) |
| H04W 74/08 | (2009.01) |

(52) U.S. Cl.
CPC ............ *H04L 43/0823* (2013.01); *H04L 1/08* (2013.01); *H04L 1/16* (2013.01); *H04W 24/08* (2013.01); *H04L 43/0852* (2013.01); *H04L 69/22* (2013.01); *H04W 74/0808* (2013.01); *H04W 84/12* (2013.01)

(58) Field of Classification Search
CPC ......... H04L 1/08; H04L 1/16; H04L 43/0823; H04L 43/0852; H04L 69/22; H04W 24/08; H04W 74/0808; H04W 84/12
See application file for complete search history.

(56) References Cited

U.S. PATENT DOCUMENTS

| | | | |
|---|---|---|---|
| 2004/0190540 A1* | 9/2004 | Miyake | H04L 1/1621 370/428 |
| 2008/0123573 A1* | 5/2008 | Jiang | H04L 1/1832 370/310 |
| 2011/0002402 A1* | 1/2011 | Smith | H04L 1/0004 375/259 |

(Continued)

*Primary Examiner* — Mohamed Kamara
(74) *Attorney, Agent, or Firm* — Christopher & Weisberg, P.A.

(57) ABSTRACT

A method and monitoring station are disclosed that enable efficient communications between a monitoring station and a wireless device. The method includes determining that receipt of a first data packet by the monitoring station from the wireless device has been received without error, receiving a subsequent data packet at the monitoring station from the wireless device, determining that the subsequent data packet being received from the wireless device is a retransmission of the first data packet, and transmitting a first acknowledgement to the wireless device before the subsequent data packet is received in its entirety. A propagation delay may be estimated and used to adjust certain parameters of the monitoring station so as to account for excessive delays that are beyond the delays anticipated by and accommodated within the IEEE802.11 Standard.

18 Claims, 12 Drawing Sheets

(56) References Cited

U.S. PATENT DOCUMENTS

| | | | |
|---|---|---|---|
| 2013/0148640 A1* | 6/2013 | Li | H04L 1/1809 370/338 |
| 2013/0176980 A1* | 7/2013 | Kneckt | H04W 28/26 370/329 |
| 2016/0345363 A1* | 11/2016 | Ni | H04W 74/08 |

* cited by examiner

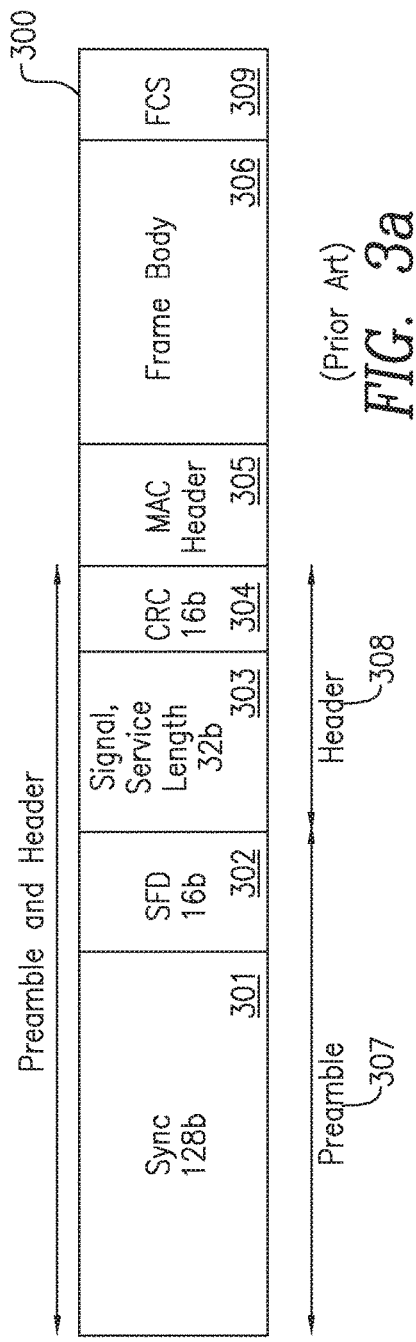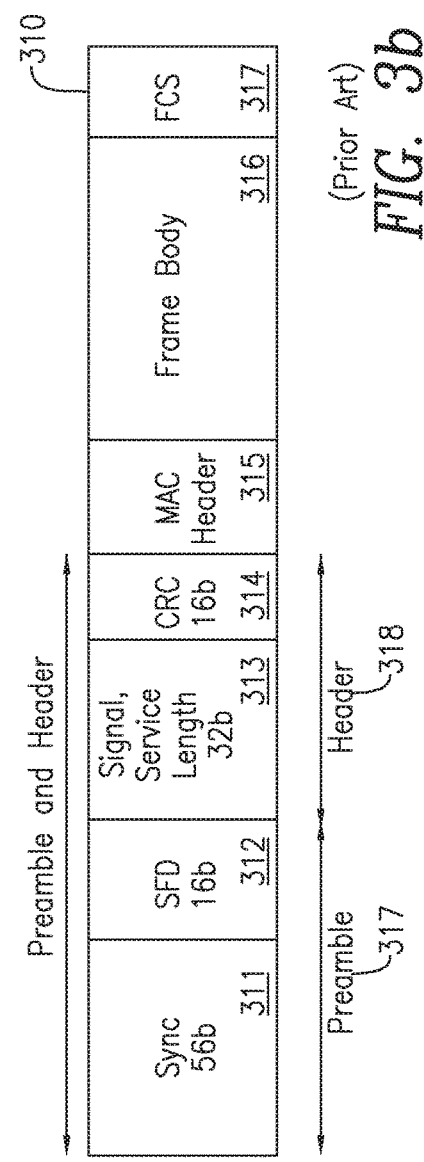
FIG. 3a (Prior Art)
FIG. 3b (Prior Art)

SYSTEM AND METHOD FOR LONG RANGE WIRELESS LOCAL AREA NETWORK COMMUNICATIONS

CROSS-REFERENCE TO RELATED APPLICATION

This application is related to and claims priority to U.S. Provisional Patent Application Ser. No. 62/162,098, filed May 15, 2015, entitled SYSTEM AND METHOD FOR LONG RANGE WLAN COMMUNICATIONS, the entirety of which is incorporated herein by reference.

STATEMENT REGARDING FEDERALLY SPONSORED RESEARCH OR DEVELOPMENT n/a

FIELD

The present disclosure relates to wireless communications and in particular to a method and monitoring station for enabling efficient long range communications between a monitoring and a target wireless device while overcoming range limitations due to timeout intervals.

BACKGROUND

The present disclosure relates to communication between devices are based upon the IEEE 802.11 technology commonly known as Wi-Fi. IEEE Standard 802.11-2012 is used as the reference for the specifications used in this disclosure. The standard exchange of packets between two stations (STAs), such as between a STA A and STA B is for STA A to transmit a packet to STA B and then wait for the acknowledgment (ACK) packet to be received back from STA B before sending the next packet. In a standard infrastructure network, either STA A or STA B may be an access point (AP). Consider the case that STA A is an AP. After the AP has transmitted the packet to a STA, the AP will wait for a set timeout period that is dependent upon the channel frequency band and the physical data rate. If the ACK is not received within that timeout period, the AP will assume that the packet failed and will, in most cases, retry the transmission. In the case that successive transmissions of that packet do not receive an ACK within the specified timeout period, then the AP will retry the packet up to a retry limit and at that point discard the packet. If it is assumed that the packet was received error free at the STA, then as each packet is retried to the limit, the resultant throughput is a fraction of what it could be.

The aforementioned timeout period is specified in the 802.11 Standard. The aforementioned timeout period is termed "ACKTimeout interval" and is defined as having a value as follows:

ACKTimeout=aSIFSTime+aSlotTime+aPHY-RX-START-Delay.

If the AP and the STA are co-operative then they can in fact, according to the Standard, adjust their ACKTimeouts to accommodate a known long range. This may be done by adding "aPropagationTime" to the "aSlotTime" in the formula above. In a fixed long range link, this may be done, i.e., the aSlotTime is extended, but for an unknown range this is impractical. In the case of the present disclosure, the AP does not know that the STA is far away and the STA is attempting to communicate at a distance. It is noted that the use of the term "long range communications" throughout this disclosure may be defined as a range such that the propagation time of the signals between the AP and the STA exceeds half the aACKTimeout value when the aSlotTime is not adjusted for air propagation time.

The individual terms aSIFSTime, aSlotTime and aPHY-RX-START-Delay are specified in the 802.11 Standard for each physical layer (PHY). For example, for a Clause 16 Direct Sequence Spread Spectrum (DSSS) device, 1 and 2 Mbps in the 2.4 GHz band, Table 16.2 in the 802.11 Standard specifies aSIFSTime of 10 μs, aSlotTime of 20 μs and aPHY-RX-START-Delay of 192 μs. For a Clause 17 High Rate DSSS (HR/DSSS) device, 5.5 and 11 Mbps in the 2.4 GHz band, Table 17.5 in the 802.11 Standard specifies aSIFSTime of 10 μs, aSlotTime of 20 μs and aPHY-RX-START-Delay of "192 μs for long preamble and 96 μs for short preamble." Each transmission starts with a preamble and header which is detected by the receiving device in order to correctly identify that the transmission is indeed an 802.11 conformant signal and subsequently correctly demodulate the packet. It should be noted that the aPHY-RX-START-Delay durations, for Clause 16 and 17 devices, commonly known as 802.11b, are equal to the preamble and header duration. Also, it should be noted that, in general, the long preamble is used when the packet is being transmitted at a PHY rate of 1 Mbps, and the short preamble is used when the packet is being transmitted at 2, 5.5 or 11 Mbps.

When receiving a packet, the receiving Clause 16 or 17 device transmits the ACK after waiting a time period equal to aSIFSTime. If it is assumed that the distance between the AP and the STA, in the present example, is d feet, then the transmission from the AP will arrive at the STA after a delay of approximately d ns. The STA will wait aSIFSTime, e.g., 10 μs, and then transmit the ACK. The ACK transmission will also be delayed by d ns, and hence the AP will receive the ACK at a time (2d/1000+aSIFSTime) μs after the end of its packet transmission. Assuming that the packet transmitted by the AP is at 1 Mbps and hence uses the long preamble, the ACKTimeout interval will be equal to 10+20+192=222 μs which appears to allow for a value for d that equates to 212/2=106 μs, equal to a distance of about 20 miles. This however is not the case. The preamble and header duration is 192 μs and in theory this must be completed before the end of the ACKTimeout interval in order for the AP to know that a valid ACK packet is being received, and hence the start of the ACK must be received by the AP within only 20 μs after the end of its packet transmission. This would only allow a distance of less than 2 miles, which is not sufficient for long range communications.

The preamble and header, for a long preamble, includes a 128 bit preamble, and a 16 bit start frame delimiter (SFD) followed by 48 header bits, a total of 192 bits, all sent at 1 Mbps. In practice, if the preamble is received within the ACKTimeout interval, then the AP may be able to recognize a valid signal and wait until the packet completes in order to establish that it is an ACK. In this case, the maximum delay would increase from 20 μs to (20+192−128)=84 μs, equivalent to a distance d of about 8 miles. Hence, in order that the ACK is received in time to prevent a retry, the maximum range of a 1 Mbps transmission, using a long preamble between the AP and STA, will be between 2 to 8 miles dependent upon the device specific implementation of the ACKTimeout interval. It should be noted that in the 802.11 Standard, 1 Mbps and 2 Mbps devices may detect the presence of a signal by implementing either an energy detect above a threshold, or by detecting a valid DSSS signal. The energy detect threshold is set at −80 dBm according to the 802.11 Standard but in general most 802.11b compliant devices use the valid signal detect, known as Carrier Sense (CS). Hence, it is necessary to detect the preamble bits and check that the valid DSSS code sequence is present.

The above background description is based upon the Clause 16 and Clause 17 PHY layers of the 802.11 Standard. A similar situation is present for other PHY layers. If using the 2.4 GHz band, then it is also possible to use the orthogonal frequency division modulation (OFDM) of Clause 19 Extended Rate PHY (ERP), commonly referred to as 11g. Similarly, in the 5 GHz band, Clause 18 devices, commonly referred to as 11a, and Clause 20 devices, commonly referred to as 11n, use OFDM. In the cases when OFDM is in use, the lowest PHY rate, and hence the PHY rate most likely to be used for long distance communication, is at 6 Mbps. For 6 Mbps OFDM, the value for aSIFSTime, according to Table 19.8 of the 802.11 Standard, is 10 μs but a signal extension of 6 μs is specified which causes the effective value for aSIFSTime to be 16 μs which will be used for the purposes of the background discussion related to this disclosure. The aSlotTime, according to Table 19.8 of the 802.11 Standard is specified as either 20 μs or 9 μs, but in practice for OFDM the 9 μs slot time is used. The aPHY-RX-START-Delay is also specified in Table 19.8 of the 802.11 Standard and a value of 24 μs is given for OFDM. Hence, for a 6 Mbps OFDM packet, the ACKTimeout interval is 16+9+25=50 μs. The duration of the OFDM header is 20 μs. An OFDM device is required to detect the presence of a signal and set a trigger, using both energy detect, i.e., any energy detected above a set threshold, and carrier detect, i.e., the receipt of a valid header which will be at the receive sensitivity level. The returning ACK to a transmitted packet must therefore be detected within 9+25=34 μs. The signal detect is specified as being set within 4 μs of the start of the reception, according to 19.4.7 of the 802.11 Standard, hence the maximum delay due to range will be (34−4)/2=15 μs, or about 2.8 miles. Similar parameters apply to devices under Clause 18 of the 802.11 Standard, commonly known as 11a and devices under Clause 20 of the 802.11 Standard, commonly known as 11n.

FIG. 1 is a block diagram of a standard communications link 100 between an AP 101 and a STA 105 in a typical IEEE 802.11 infrastructure network. The AP 101 has an antenna 102. STA 105 has an antenna 106. The distance between the two antennas is d 110. The propagation time for a radio signal between the two antennas 102 and 103 will be d/C where C is the speed of light. If d is in feet, then the propagation time is about d ns. Assuming that a radio signal is transmitted by the AP 101, if the distance 110 between the two antennas 102 and 106 is 1 mile, the radio signal received at antenna 106 will be delayed by 5.28 μs, referred to the time of the transmission from antenna 102.

FIG. 2 is a timing diagram that depicts the typical transmission of a packet from an AP 200 to a STA 205 in time. At time T1 211, the AP 200 starts to transmit packet 202. Packet 202 has a duration of tp 230. At time T2 221 the STA 205 starts to receive the packet 203 which may or may not be identical to the transmitted packet 202 dependent upon the propagation conditions. For the purposes of this description it is assumed that packet 203 has the same content as packet 202. At time T3 212, AP 200 completes the transmission of packet 202 and at time T4 222, STA 205 will complete receiving the packet 203. The time differences (T2−T1) and (T4−T3) will be the same and will have a value δ 231 that corresponds to the distance between the AP 200 and the STA 205, as previously described in FIG. 1. At time T5 223, STA 205 will transmit an acknowledgement packet (ACK) 221 back to the AP 200. The time difference (T5−T4), $t_{SIFS}$ 632, will be equal to the aSIFSTime as defined in the 802.11 Standard which, as previously explained, is the time that a STA will wait after the completion of a received packet before sending an ACK packet in response. At time T6 213 the ACK packet 222, which is the same as the ACK packet 221 transmitted by the STA 205 at time T5 223, will start to be received by the AP 200. Note that the time difference δ 233, between T6 213 and T5 223, will again represent the propagation time between the AP 200 and the STA 205 and will be equal in value to δ 231. Hence, the time that elapses, at the AP 200, from the end of the transmission T3 212 of packet 202 to the start of the reception of the ACK packet 222 at time T6 213 is equal to (2δ+aSIFSTime), where δ is the propagation time related to the distance between the AP 200 and the STA 205 as previously described in FIG. 1. As previously described, if the distance, and hence the propagation time, exceeds a certain value, then the AP 200 will receive the ACK 222 too late and it will assume that the transmitted packet 202 failed. At this point the AP 200 will start proceedings to send a retry of packet 202.

FIGS. 3a and 3b show the format of typical 802.11 data packets. FIG. 3a is a diagram that shows the format 300 of an 802.11 transmitted packet using a long preamble at 2.4 GHz. The preamble 307 consists of a synchronization field 301 followed by the Start Frame Delineator (SFD) 302. The synchronization field 301 consists of 128 bits in the case of the long preamble. The preamble 307 is followed by the header 308 which includes the signal, service, and length fields 303 followed by a cyclic redundancy check (CRC) 304. Together the preamble 307 and header 308 comprise 192 bits and are sent at 1 Mbps. Hence the duration of the preamble and header is 192 μs. After the CRC 304 comes the media access control (MAC) header 305 and frame body 316. At the end of the packet if the frame check sum (FCS) 309 which is used to check if the packet has been received with no errors. Referring back to FIG. 2, the time T4 222, the end of the received packet 203, is the point at which the FCS error check has been carried out successfully.

FIG. 3b is a diagram that shows the typical format 310 of an 802.11 transmitted packet using a short preamble at 2.4 GHz. This is similar to FIG. 3a except that the synchronization field 311 of the preamble 317 is 56 bits compared to 128 bits for the synchronization field 301 used in the long preamble 307. The synchronization field 311 is followed by the Start Frame Delineator (SFD) 312. The preamble 317 is flowed by the header 318 which consists of the signal, service, and length fields 313 followed by a cyclic redundancy check (CRC) 314. Together the preamble 317 and header 318 comprise 72 bits and are sent at 1 Mbps. Hence the duration of the preamble and header is 72 μs. The CRC 304 is followed by the MAC header 315 and frame body 316. At the end of the packet is the frame check sum (FCS) 317. In the case of a short preamble, the header 318 is transmitted at 2 Mbps. Hence, the short preamble can only be used if the MAC header 315 and packet frame body 316 is being sent at 2, 5.5 or 11 Mbps. For a 1 Mbps transmission, the long preamble 307 FIG. 3a is used.

FIG. 4 is a block diagram that shows the typical format of an 802.11 OFDM transmitted packet 400 for clause 18, 19 and 20 devices of the 802.11 Standard commonly known as 11a, 11g and 11n respectively. The preamble and signal 407 are transmitted at the 6 Mbps OFDM rate. The preamble 401 is 16 μs in duration and includes 12 symbols, 10 short and 2 long. The preamble 401 is followed by the signal field 402 which is a single symbol. After the preamble and signal 407 comes the service and MAC frame 408 comprised of the service field 403, the MAC header 404 the frame body 405 and finally the FCS 406. The service and MAC frame 408 is transmitted at the chosen data rate for the packet. The preamble and signal 407 are sent at 6 Mbps.

The FCS field is used to verify that the packet has been received correctly. If in a received packet the FCS check is correct then the ACK should be sent. If the FCS check fails then an ACK is not sent. Therefore, the point at which a device knows that a packet has been received, and that it is correct, is at the end of the packet after checking the FCS field. Also, it should be noted that the ACK packet is not transmitted until a time of aSIFSTime has elapsed after the end of the received packet. This is to allow time for the transmitting device to switch from transmit mode to receive mode in order to receive the ACK. When the AP and the STA are close, then the aSIFSTime is the elapsed time between the end of the transmitted packet and the start of the received ACK packet. If the AP and the STA are at a distance from each other, then the time between the end of the transmitted packet and the start of reception of the received ACK packet will be greater. Hence, the ACKTimeout interval is used to allow the transmitting station to wait for the ACK but not wait too long in the case that the ACK is not being sent. This restriction on the ACKTimeout interval is a limitation on efficient communications over extended ranges.

FIG. 5 and FIG. 6 describe a known method for estimating the time delay and hence the distance between two stations. The method described does not in itself form part of this disclosure, but the use of the method of measuring the delay and then using the result of the measurement to improve the communication at extended range does form part of this disclosure.

FIG. 5 is a timing diagram that describes a basic active ranging method that may be used to determine the distance between a STA A 500 and another STA B 505. The time axis 510 refers to STA A 500 and the time axis 520 refers to STA B 505. At time T1 511, STA A 500 transmits a packet to STA B 505. This transmission 512 is received at STA B 505 at time T2 513. The propagation time of the transmission 512 is (T2−T1) 530. STA B 505 transmits a response 524 at time T3 523. The time 522 that has elapsed between the reception of the packet at time T2 513 and the transmission at time T3 523 is the turnaround time at STA B 505. Ideally the turnaround time 522 at STA B will be equal in duration to aSIFSTime (SIFS). This is the case when the first transmitted packet is a ready-to-send (RTS) control packet which will generate a clear-to-send (CTS) control response packet. Also the initial packet may be a data null packet and the response an ACK packet. A variety of packets may be used. However, the turnaround time for the response packet should be known. At time T4 514, STA A 500 receives the response 524 from STA B 505. The propagation time of the transmission 524 is (T4−T3) 534. It should be noted that the time differences 530 and 534 represent the propagation time, δ, of the transmissions and should be equal assuming the distance between the two stations has not changed. The total time that elapses between the transmission 512 and the reception 524 at STA A 500 is:

$$(T2-T1)+(T3-T2)+(T4-T3)=(T4-T1)=\delta+SIFS+\delta \quad (5)$$

Hence, $\delta=(T4-T1-SIFS)/2$ (6)

Expression (6) is a simplified equation that is included so as to provide an understanding of the general idea of a ranging transmission method. Note that the duration of the transmitted packet and the response packet is not accounted for in equation (5). Note also that, in practice, it is common that the timestamp of a packet is set to coincide with the end of the packet at the point where the FCS check is completed.

FIG. 6 is a time diagram that describes in further detail a general ranging transmission method. Time axis 610 refers to STA A 600 and time axis 620 refers to STA B 605. At time Ta 611 STA A starts the transmission of packet 602 which is addressed to STA B 605. After a time delay of δ, at time Tb 621, STA B 605 starts to receive packet 603, which ideally is identical to packet 602. Packet 603 may differ in the value of particular bits dues to propagation conditions but in general, the packets are the same. At time Tc 612 STA A 600 completes the transmission of packet 602 and at time Td 622 STA B 605 completes the reception of packet 603. The time difference between Tc 612 and Td 622 is δ the propagation time for the packet to travel from STA A 600 to STA B 605. Note that the time differences (Tc−Ta) and (Td−Tb) are both the duration tp 630 of the transmitted packet 602.

STA B 605 transmits the response packet 621 at time Te 623. Assuming that the response is an ACK or an RTS packet in reply to the received packet 603, time Te ideally will be at a time $t_{SIFS}$ 632 after time Td 622, where $t_{SIFS}$ 632 is the aSIFSTime as defined in the IEEE 802.11 standard [1]. At time Tf 613, STA A 600 starts to receive the response 622 which ideally is identical to response 621 sent by STA B 605. At time Tg 624 STA B 605 completes the transmission of the response 621 and at time Th 622, STA A 600 completes receiving the response 622. Note that the time differences (Tb−Ta), (Td−Tc), (Tf−Te) and (Th−Tg) are all equal and have the value δ which is the propagation time for the packet and response to travel between the two STAs. At STA A 600, the time of a packet at the point when the frame check has completed may be recorded. Hence, at STA A 600, the monitoring station, the time for the transmission of packet 602 that is recorded is Tc 612, and the time that is recorded for the reception of the response 622 is Th 614. In order to calculate the value of δ it is necessary to know the duration tr 634 of the response 622. Calculating the duration tr 634 is possible as the monitoring station, STA A 600 can monitor the details of the response packet such as data rate and length. In practice therefore, STA A 600 can calculate the value of δ from expression (7):

$$\delta=(Th-Td-tr-t_{SIFS})/2 \quad (7)$$

FIG. 7 is a diagram that shows the times associated with the sending of an 802.11 packet 700 using conventional timing and is drawn in more detail than that described in FIG. 2 so as to include the details described in FIG. 3 and FIG. 4. The packet 700 is transmitted by the AP 750 at time T1 740. At time T2 741 the STA 760 starts to receive packet 710 which for is assumed to be identical to packet 700. Also, for this example, the packet is a 1000 byte packet being transmitted at 1 Mbps on a 2.4 GHz channel. Time difference (T2−T1) is the propagation delay. The transmitted packet 700 starts with the preamble field 701, followed by the header field 702, the MAC header 702, the frame body 704 and finally the FCS field 705. At time T3 742 the AP 750 completes the transmission of the packet 700. At the STA 760, the reception of packet 710 is after the completion of the FCS at time T4. Time difference (T4−T3) is the propagation delay, equal to (T2−T1). At time T5, the ACK packet 720 is transmitted to the AP 750 by the STA 760. The time difference (T5−T4) may be equal to aSIFSTime or may be less, as previously described. At time T6 745 the AP 750 starts to receive the ACK packet 730 which for purposes herein is identical to ACK packet 720. Time difference (T6−T5) is the propagation delay, equal to (T2−T1) and (T4−T3). At time T7 the receipt of the preamble 731 of the ACK packet 730, is completed.

The time difference (T7−T3) represents the time that has elapsed at the AP 750 after having completed the transmission of packet 700 and receiving, or identifying the receipt of the expected ACK packet. To illustrate the timing, the following example is used. For example, assuming a distance between the AP 750 and the STA 760 of 19 miles, the corresponding propagation delay is about 100 μs. A 1000 byte packet at 1 Mbps is 9130 μs duration in total. The duration of a 1 Mbps ACK packet is 304 μs of which the preamble is 128 μs duration. Continuing the example, assuming that aSIFSTime was used by the STA, then the delay (T7−T3) has a value of 100+10+100+128=338 μs. This exceeds the ACKTimeout interval of 222 μs and therefore the AP 750 will have assumed that the packet 700 was not received and will proceed to retry the packet. There is every chance that the AP 750 will already be re-transmitting the packet 700 when the ACK is present at the AP antenna, but even if the ACK is received at this late time, the AP 700 will not know the source and will disregard it. It should be noted that ACK packets do not include the address of the originating station. ACK packets only include the destination address.

In the case that a STA is attempting to establish long range communication with a standard AP such that it can receive from and transmit to that AP, the ACKTimeout interval used by the AP is assumed to be to the 802.11 Standard. However, when attempting long range Wi-Fi communications, associated propagation losses result in retries and degrades the communication throughput. Also, a timeout of the device waiting for the ACK may occur. One attempted solution is to increase the ACKTimeout interval, but this requires that the device is a special implementation.

SUMMARY

The present disclosure advantageously provides a method and monitoring station for facilitating communications such as long range communications between a monitoring station and a wireless device.

In one aspect of the disclosure, a method for communications between a monitoring station and a wireless device is provided. The method includes determining that receipt of a first data packet at the monitoring station from the wireless device has been received without error, receiving a subsequent data packet at the monitoring station from the wireless device, determining that the subsequent data packet being received from the wireless device is a retransmission of the first data packet, and transmitting a first acknowledgement to the wireless device before the subsequent data packet is received in its entirety.

In another aspect of the disclosure, a method for communications between a monitoring station and a wireless device is provided where the method includes determining that receipt of a first data packet at the monitoring station from the wireless device has been received without error, receiving a subsequent data packet at the monitoring station from the wireless device, determining that the subsequent data packet being received from the wireless device is a retransmission of the first data packet by checking a MAC header of the received first data packet, determining a time of reception of a field of the subsequent data packet, determining a trigger time based on the determined time of reception of the field of the subsequent data packet, determining a time interval before transmitting a first acknowledgement, the time interval based upon the trigger time, and transmitting the first acknowledgement to the wireless device after the time interval has elapsed and before the subsequent data packet is received in its entirety.

In accordance with still another aspect, the disclosure provides a monitoring station for long range communications with a wireless device. The monitoring station includes an interface configured to receive a first data packet from the wireless device, and receive a subsequent data packet at the monitoring station from the wireless device, and processing circuitry. The processing circuitry includes a processor, and a memory storing instructions that, when executed, configure the processor to determine that receipt of the first data packet from the wireless device has been received without error and determine that the subsequent data packet being received from the wireless device is a retransmission of the first data packet. The interface is further configured to transmit a first acknowledgement to the wireless device before the subsequent data packet is received in its entirety.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 3*a* is a block diagram that shows the format of an 802.11 transmitted packet using long preamble at 2.4 GHz;

FIG. 3*b* is a block diagram that shows the format of an 802.11 transmitted packet using short preamble at 2.4 GHz;

DETAILED DESCRIPTION

Figure 1:
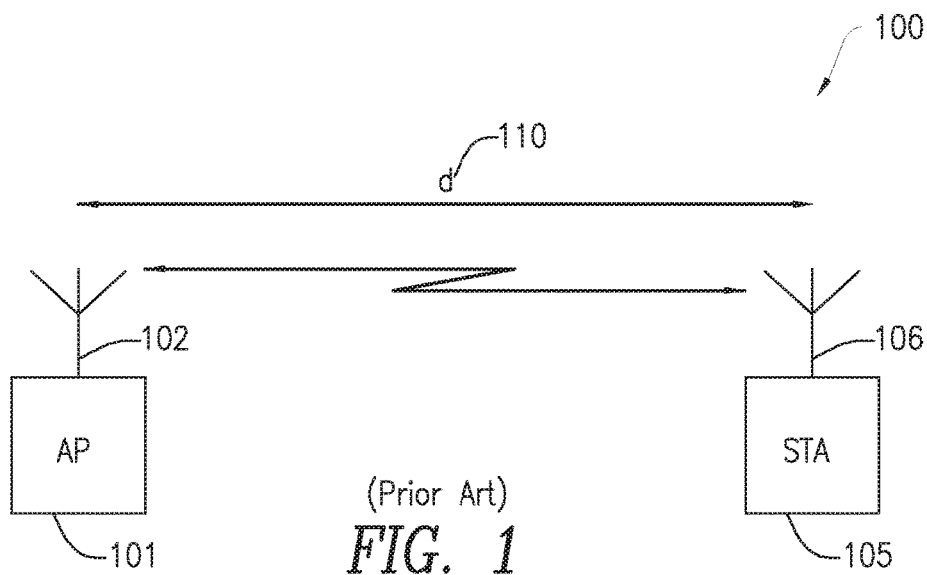
FIG. 1 is a block diagram of a typical communications link between an AP and a STA in a typical IEEE 802.11 infrastructure network.

This disclosure is for communication over extended ranges with devices that are based upon the IEEE 802.11 technology, commonly known as Wi-Fi. This disclosure is for the case of extended range communication from a monitoring device to a legacy target device. The legacy target device is one that complies with the 802.11 Standard, generally known as Wi-Fi, in that it is not modified in any way for extended range communications. The monitoring device is one that generally complies with the 802.11 Standard but has been modified, as described in this disclosure, so as to enable extended range communications with the target device. Although the embodiments disclosed herein relate to Wi-Fi communications, the disclosure is not limited to only Wi-Fi communications, and may be applied to other types of communications between wireless devices.

Methods to overcome the range limit imposed by the ACKTimeout interval are described in this disclosure. Also, methods are disclosed that enable the monitoring Wi-Fi device to communicate at extended ranges with a legacy target Wi-Fi device. The legacy target device may be a device such as a station (STA) or an access point (AP). In the following description, the target legacy device is described as an AP as this represents a particular use case and aids in the descriptive process. However, the disclosure is not limited solely to such an arrangement.

As discussed above, in compliance with the 802.11 Standard, the ACK packet is not transmitted until a time of aSIFSTime has elapsed after the reception of a data packet. However, according to embodiments disclosed herein, when at extended range, the ACK may be sent as quickly as possible after confirmation that the received packet is correct and hence effectively reduce the delay of the ACK being received and as such, increase the communication range. As also described herein, in another embodiment, the range, and hence the time delay between the devices is established, and then used as the basis for calculating the time that an ACK needs to be sent in order to be received in a timely manner and prevent retries. The procedure includes first receiving the packet and checking a field of the received packet, for example, the FCS field, and then, if the packet was received without error, sending an ACK to the retry of that packet, the ACK being sent before the retry packet has been received in its entirety.

As previously explained, the ACK packet is not transmitted until a time of aSIFSTime has elapsed. The value of the aSIFSTime allows a minimum time for the transmitting device to switch from transmit mode to receive mode in order to receive the ACK. When at extended range, however, there is no need to wait for the full aSIFSTime and the ACK can be sent as quickly as possible after confirmation that the received packet is correct. For example, for an 802.11b compliant communication, if the ACK was sent 2 μs after the completion of the received packet, instead of waiting for 10 μs as required, then this would result in an effective increase of range of about 0.75 miles. In the case of an OFDM communication, where the aSIFSTime is 16 μs, a reduction of 14 μs in the delay in sending the ACK would result in a range increase of 1.32 miles.

In one embodiment, the range between the devices and hence the time delay is determined, and then used as the basis for calculating the time that an ACK need to be sent in order to be received correctly and prevent retries. At extended ranges, the ACK to be sent by the monitoring STA in response to a packet being received from the target AP should be sent by the monitoring STA before the packet being received has completed, i.e., before the FCS check has been carried out. In addition, only a packet that has been received without errors should be acknowledged. Hence, in one embodiment, the packet is received and the FCS field checked, and then, if the packet was received without error, an ACK is sent to the retry of that packet, the ACK being sent before the retry packet has been received in its entirety. In order to calculate the time when the ACK needs to be sent such that it is received in time at the target AP, the monitoring STA uses the time delay previously established, to establish that the packet being received is indeed the expected retry packet, and then uses a timing trigger which needs to be based upon a reliable time point within the initial portion of the received packet.

Figure 2:
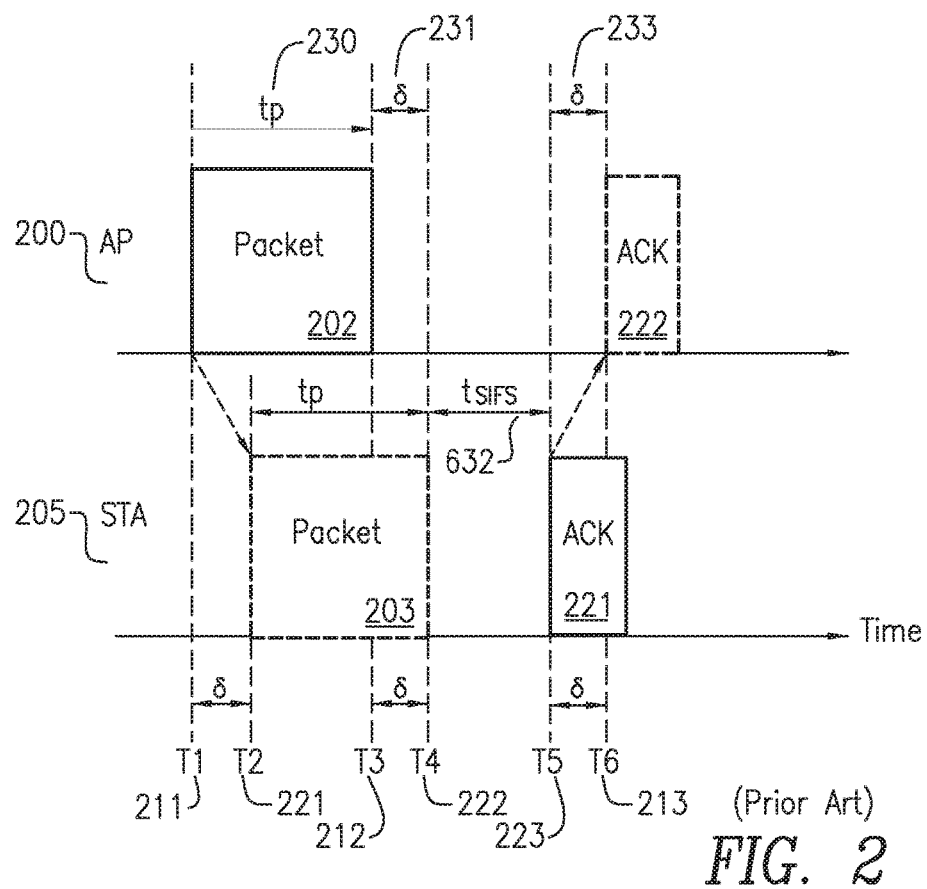
FIG. 2 is a timing diagram that depicts the transmission of a packet from an AP to a STA.
Figure 4:
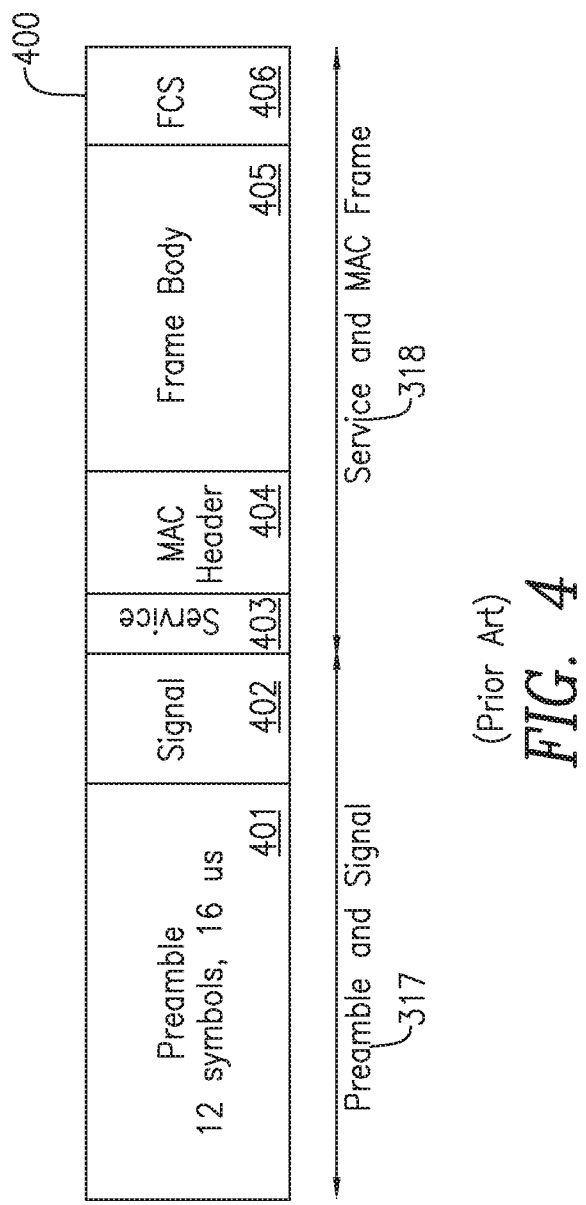
FIG. 4 is a block diagram that shows the format of an 802.11 OFDM transmitted packet.
Figure 8:
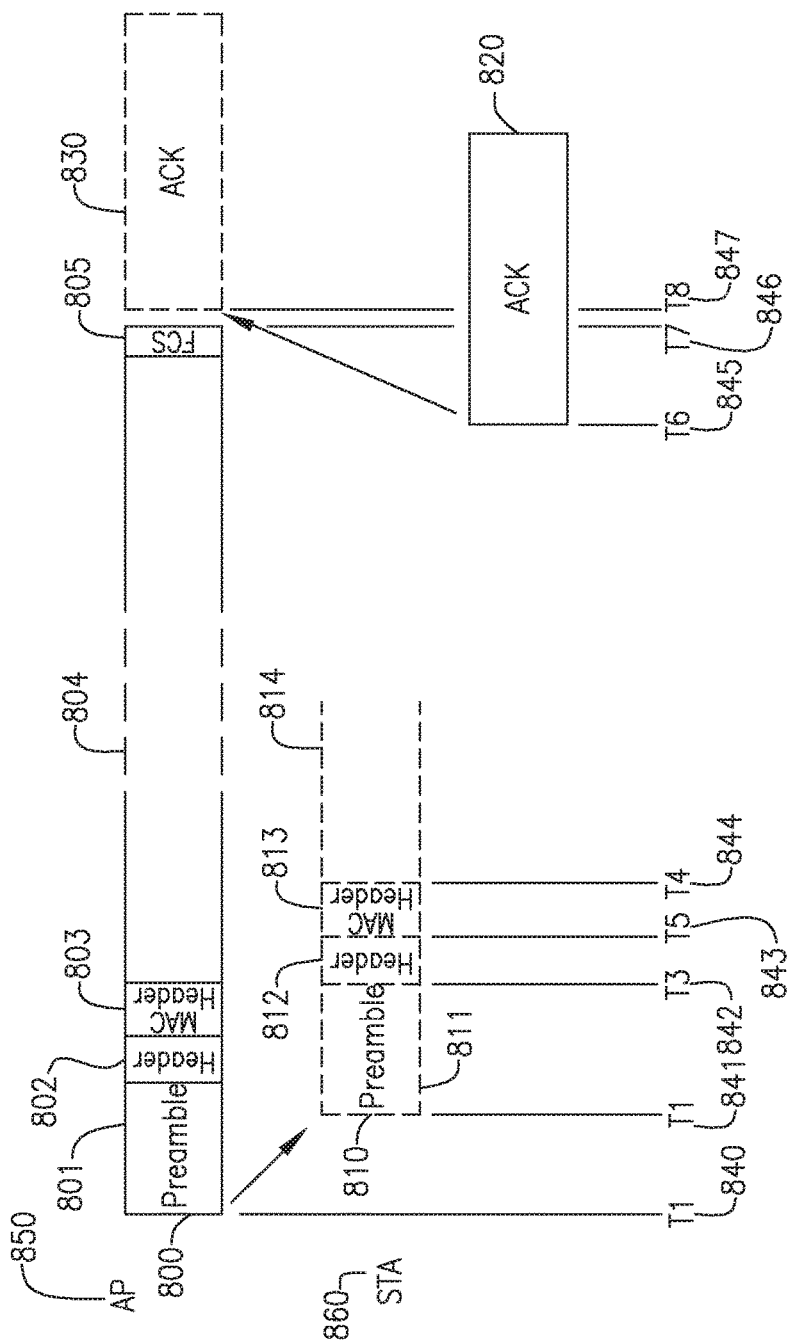
FIG. 8 is a diagram that shows the times associated with the sending of an 802.11 packet using timing according to an embodiment of the present disclosure.

FIG. 8 is a diagram that shows the times associated with the transmission of an 802.11 packet 800 and the response according to an embodiment of this disclosure. The packet 800 is transmitted by the AP 850 at time T1 840. At time T2 841 the STA 860 starts to receive packet 810 which shall be considered to be identical to packet 800. Also, for this example, the packet is a 1000 byte packet being transmitted at 1 Mbps on a 2.4 GHz channel. Time difference (T2–T1) is the propagation delay. The transmitted packet 800 starts with the preamble field 801, followed by the header field 802, the MAC header 803, the frame body 804 and finally the FCS field 805. At time T3 842 the STA 860 receives the end of the preamble 811 and at time T5 843 the STA 860 receives the end of the header field 812. At time T4 844 the STA 860 receives the end of the MAC header field 813. As discussed above with respect to FIGS. 3a and 3b, at the end of the header field there is a CRC check and hence the validity of the signal, service and length fields can be verified. At the end of the MAC header field 813, the STA 860 can verify that the address fields present in the MAC header indicate that the packet originated from AP 850 and is addressed to STA 860. The STA 860 can examine the sequence number of the packet, also in the MAC header, and furthermore, the STA 860 can verify that the packet is a retry by examining the retry bit in the frame control field of the MAC header. The address fields, sequence number and retry bit details can be seen by reference to FIG. 8-1 MAC Frame Format and FIG. 8-2 Frame Control Field in the 802.11 Standard, incorporated by reference herein.

In one embodiment, it is desired that a packet is received without error. Referring back to FIG. 7, assume that this represents the case of the first attempt by the AP 750 to transmit a packet, 700. In our example, the AP 750 assumes that the packet failed because it did not receive the ACK 730 in time. However, in the example shown in FIG. 7, STA 760 did receive the packet without error because an ACK was transmitted. Therefore, assume that FIG. 8 represents the case where the AP 850 is sending the retry packet and that the STA 860 has already received that packet without error. Hence, at time T5 844, the STA 860 knows that the received packet is addressed to itself, it is a retry, and that the sequence number indicates that this is the same packet that it has previously received without error. In this case, STA 860 need not receive the rest of the packet 810. Assume also that the packet delay (T2–T1) has already been estimated as described with reference to FIG. 5 and FIG. 6. Therefore at time T5 844, STA 860 can drop the reception of the packet 810 and prepare for the transmission of the ACK packet 820 at time T6 845. At time T6 845, STA 860 transmits the ACK packet 820. At time T7 846, the AP 850 completes the transmission of the retry packet 800. Because STA 860 has already started to send the ACK packet 820 at time T6 845, the ACK packet 830 is received at time T8 847 at a time that is calculated by STA 860, such that (T8–T7) is between aSIFSTime and aSIFSTime plus aSlotTime. Thus, the AP 850 experiences the reception of a timely ACK 830 to its transmitted retry packet 800 and hence the AP 850 will note the successful transmission.

A method used by STA 860 to calculate the time to start sending the ACK 820 is described using the same example described with reference to FIG. 7. In this example, it is still assumed that the distance between the AP 850 and the STA 860 is 19 miles, which corresponds to a propagation delay of about 100 μs. Packet 800 is a 1000 byte packet at 1 Mbps which has a duration of 9130 μs duration in total. The preamble and header is 192 μs, the MAC header is generally 26 octets which is 208 μs in duration. All of these values are known by the STA 860. It should be noted that, even in the case where the retry packet is transmitted using a different data rate than the first packet, the information provided in the preamble and header field provide the information to calculate the duration of the packet. In our example, T2 841 is 100 μs after the start of the packet 800 transmission at T1 840. Time T5 844 will be 192+208=400 μs after time T2 841. At time T5 844 STA 860 has verified that this is indeed the desired retry packet. STA 860 knows that the packet 800 will finish transmission at time T7 846 which is 9130−100−400=8630 μs after STA 860 has verified the end of the MAC header 813 at time T5. STA 860 also knows that there will be a delay of 100 μs for the ACK packet 820 to reach the AP 850 so hence, STA 860 will start to send the ACK packet 820 at time T6 845 where (T6−T5)=9130−100−400−100+10=8540 μs. Therefore, the following times correspond to FIG. 8: T1=0, T2=100 μs, T5=500 μs, T6=9040 μs, T7=9130 μs and T8=9149 μs. Hence, the ACK packet 830 arrives at AP 850 10 μs after the end of packet 800, a time equal to aSIFSTime. It should be noted that the time for the STA 860 to generate the ACK 820 to a retry packet 800 can be readily calculated so as to arrive at the AP 850 at the correct time. Although some implementations of devices have been observed to not use an accurate aSIFSTime, a variation of a few microseconds will not cause the generated ACK to arrive too late. Indeed, it might be prudent to base the calculation on aSIFSTime plus a few microseconds, for example, 5 μs, to cover the case where a device may be using an incorrect aSIFSTime.

Figure 5:
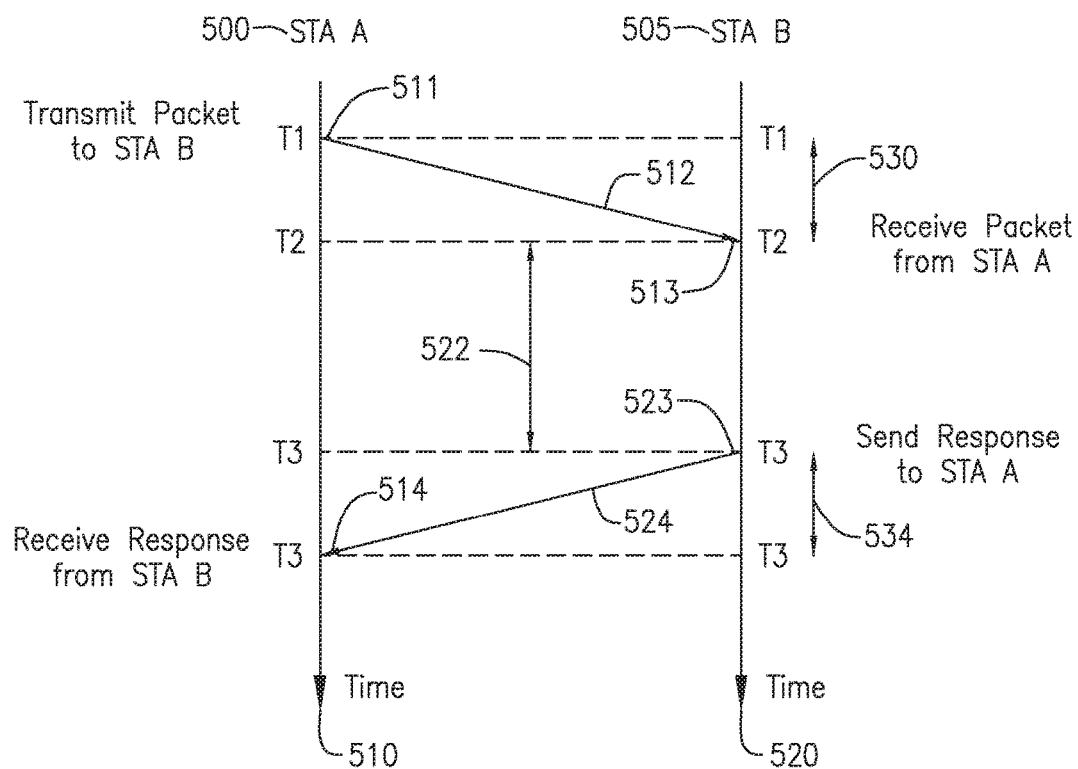
FIG. 5 is a timing diagram that shows the sequence of an exchange of 802.11 packets.
Figure 6:
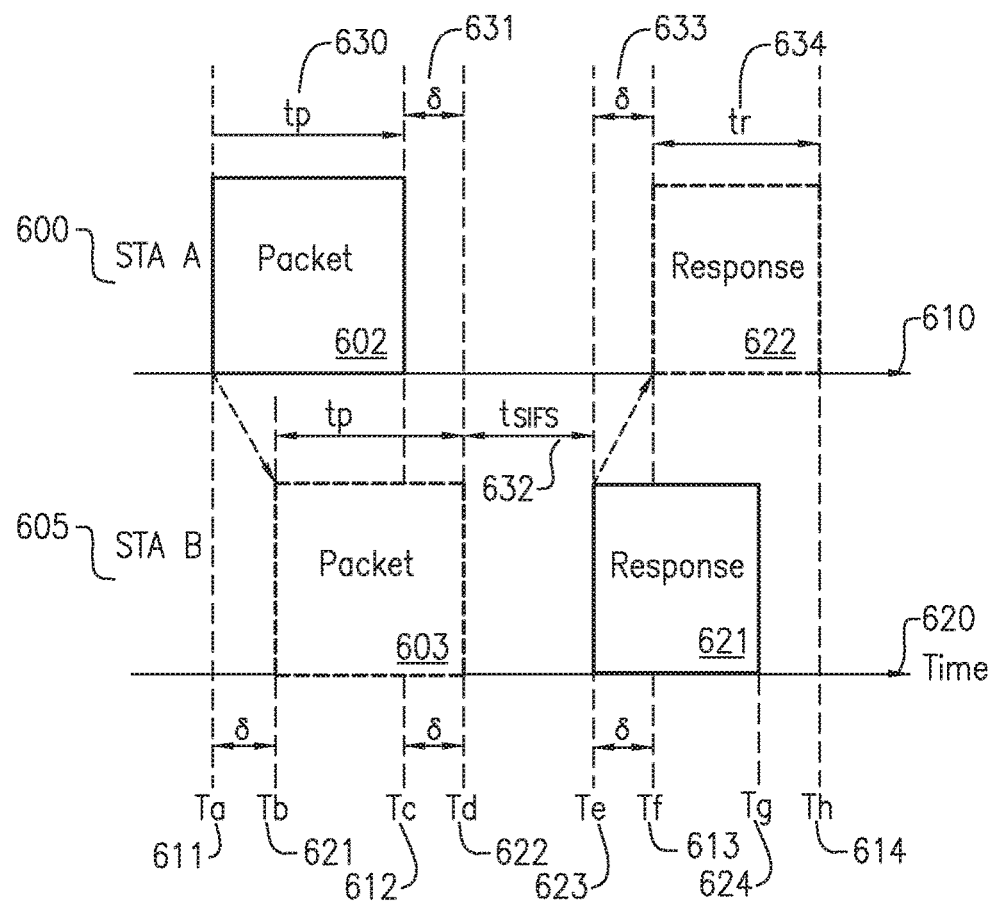
FIG. 6 is an alternative timing diagram of the packet exchange shown in FIG. 5.
Figure 9:
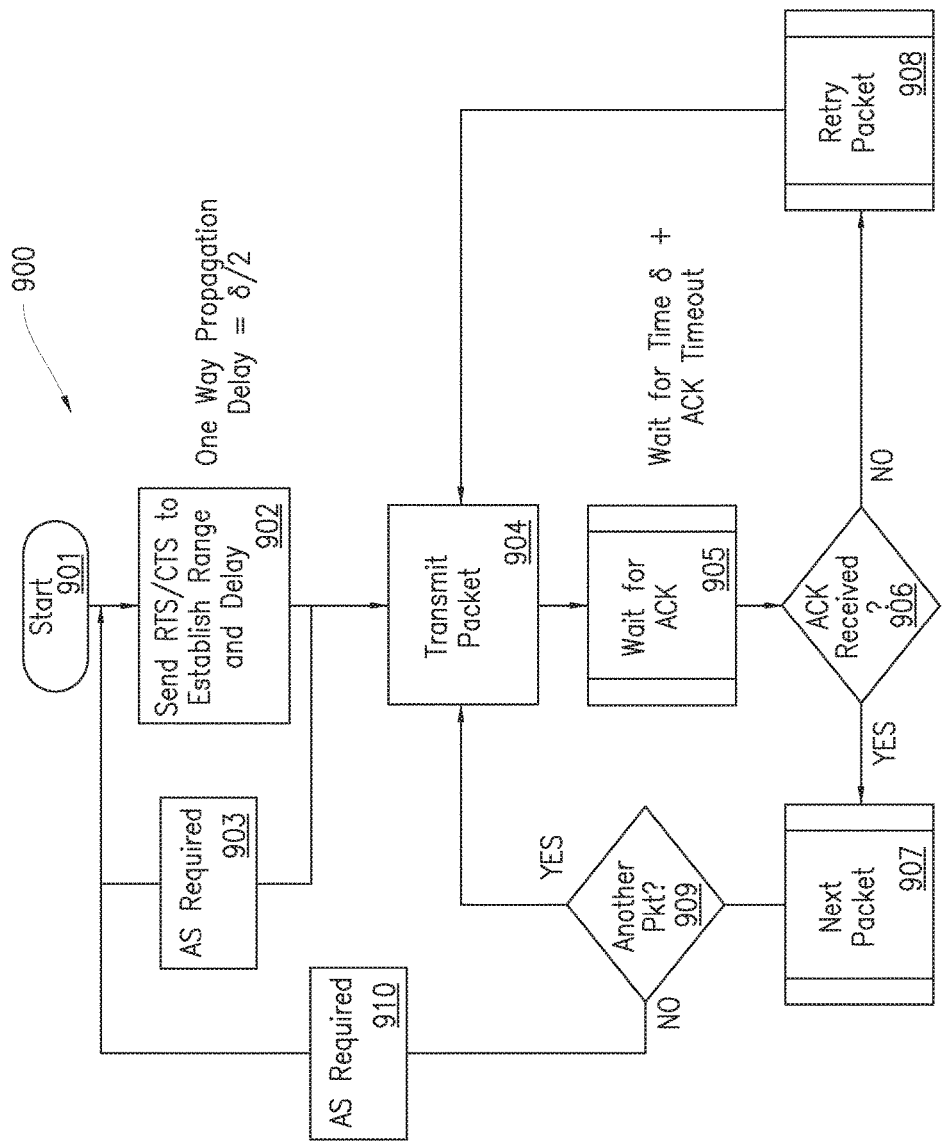
FIG. 9 is a flow diagram illustrating the sending of a packet from one STA to a distant legacy STA or AP according to an embodiment of the present disclosure.

FIG. 9 is a flow chart that describes an embodiment of the disclosure when transmitting packets from the monitor STA 860 to the target STA or AP 850. The process 900 may start at block 901 and may be followed by block 902 which carries out the ranging process as described in FIG. 5 and FIG. 6. Note that although specific distances are used in the examples, this is for ease of explanation. Implementations are not limited to the distances described. Block 902 may be repeated at set intervals or as required. After block 902, block 903 may repeat the ranging process of block 902, as required. The ranging process may be repeated periodically according, for example, to the relative movement between the stations due to, for example, the velocity of the platform upon which the monitoring STA 860 is located. An alternative method to the ranging process described in FIG. 5 and FIG. 6 is that if a location is otherwise established or known for the target station, such as GPS co-ordinates, then with knowledge of the location of the monitoring STA 860 the distance to the target and hence the delay can be calculated. Block 902 may be followed by block 904 where the packet is transmitted. After transmission in block 904, the STA 860 will wait for an ACK from the target. The expected wait time before the ACK is received will be the delay time, which may be as determined in block 902, plus aSIFSTime. This wait time may be in excess of the standard ACKTimeout interval and therefore the monitor STA 860 may use a value for ACKTimeout interval that is equal to the delay plus the ACKTimeout interval.

To accommodate extended ranges, the ACKTimeout interval may need to be increased and this increased value is used in block 905. In block 906 it is determined if the ACK is received. If no ACK is received within the adjusted ACKTimeout interval, the packet may be retried via block 908 by returning to block 904. If the ACK is received successfully in block 906, then the next packet is transmitted in block 907, and in block 909 it is determined if there is another packet being transmitted. If another packet is to be transmitted, the next packet may be transmitted via block 904. If there is not another packet to be transmitted, as checked in block 909, the process may return to block 902 or may simply wait for another packet to be transmitted in block 904. The decision to carry out another ranging measurement in block 902 may be determined by block 910.

Figure 7:
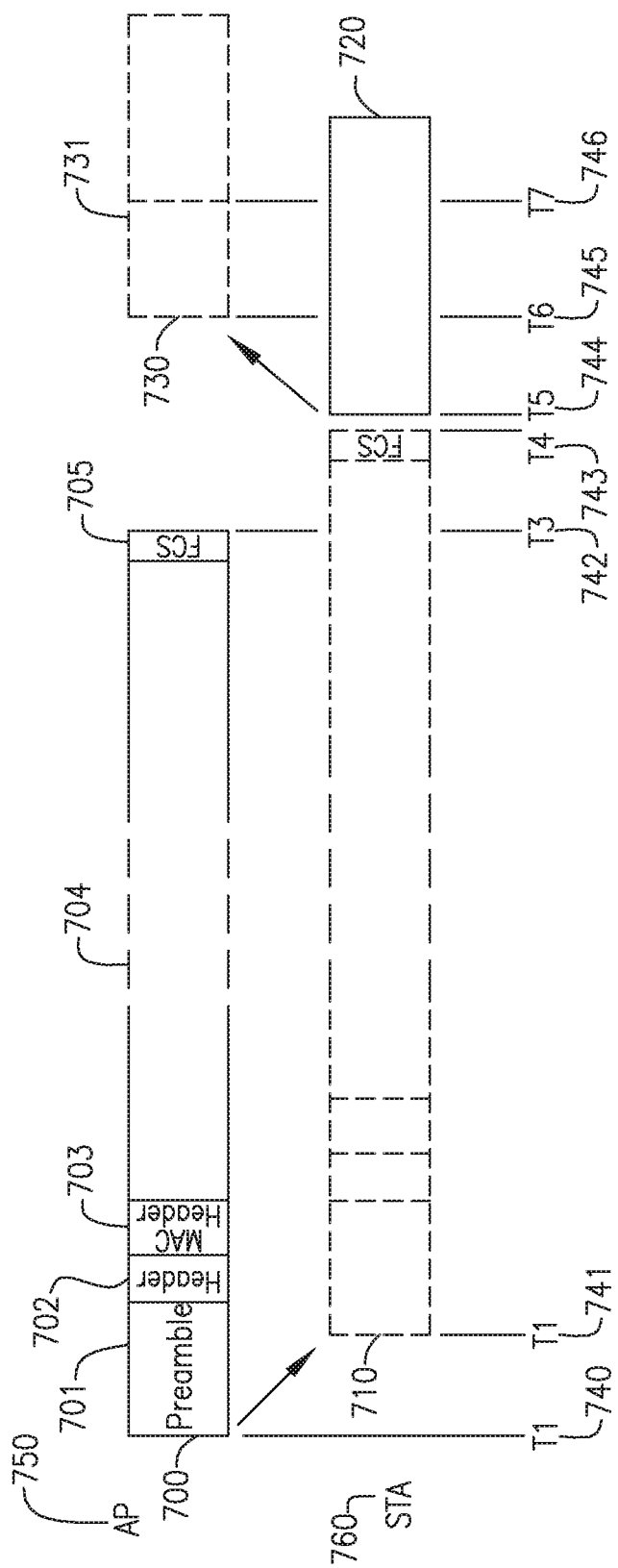
FIG. 7 is a diagram that shows the times associated with the sending of an 802.11 packet using conventional timing.
Figure 10:
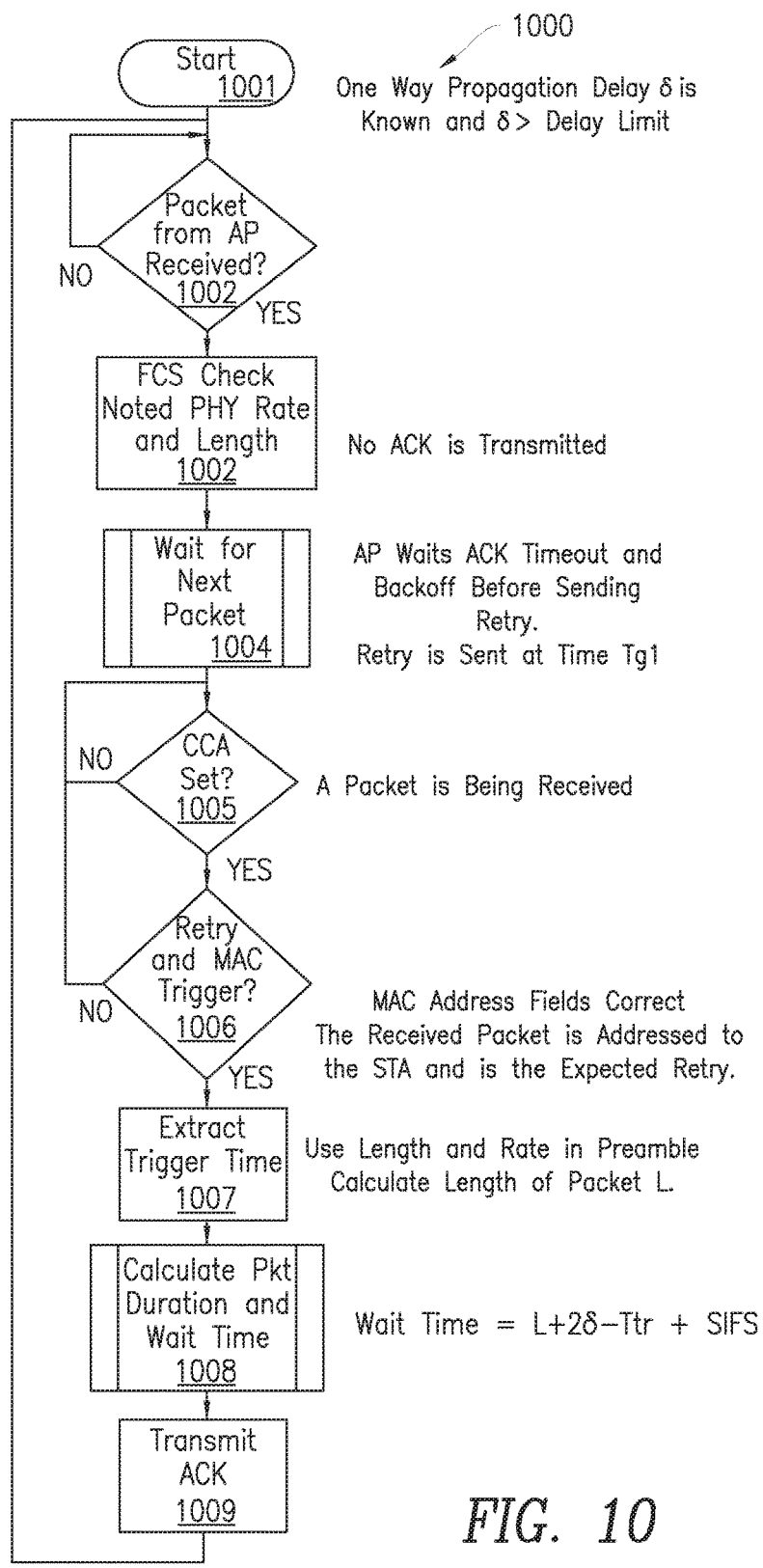
FIG. 10 is a flow diagram illustrating the reception of packets from a distant legacy STA according to an embodiment of the present disclosure.

FIG. 10 is a flow diagram 1000 of an embodiment of this disclosure showing the blocks to receive packets at a monitoring STA 860 from a distant legacy STA or AP. 850 The process herein described is comparable with the descriptions provided for FIG. 7 and FIG. 8. The process may begin with block 1001. Within block 1001, the one way propagation delay σ, which may be determined as described above and in FIG. 5 and FIG. 6, as per block 902 of FIG. 9, will be known. After initialization in block 1001, the reception of a packet may be detected in block 1002. Block 1002 represents the reception for the first time of a particular packet. If the packet is received in block 1002, the packet is demodulated and then in block 1003 checked that it has been received without error by checking that the FCS field is correct. In block 1003 the PHY rate and the length of the packet may be noted by, for example, examining the preamble and header. Once established that the packet has been received correctly, the monitoring STA 860 may send an ACK but need not. If the one way delay is such that the ACK will not arrive at the legacy STA or AP in time to be accepted, then the sending of an ACK is moot.

Block 1003 may be followed by block 1004 where the monitoring STA 860 awaits the expected retry packet from the legacy STA or AP 850. Block 1005 may detect the arrival of a retry packet and may signify this by setting the clear channel assessment (CCA) either by detecting the presence of energy, or by detecting the presence of a valid preamble and header. Once established that a packet is being received, block 1005 may be followed by block 1006 where the retry bit and the MAC header fields may be checked to determine if the received packet is the expected retry. If the received packet is not the expected retry, then the process may return to block 1005. If in block 1006 it is determined that the received packet is the expected retry packet then in block 1007 the trigger time may be extracted.

There are set times within a received packet that may be used as a trigger. For example, the reception of any particular field could be used as the trigger time. In one embodiment, the time that CCA is exerted, the end of the preamble and header, or the end of the MAC Header field may be used as the trigger time. The time when the end of the MAC Header is received can provide a good indication if the received packet is the expected retry packet, or not, so hence, it represents a good candidate for the timing trigger. The actual trigger signal need not necessarily be the end of the MAC Header. For example, if CCA is used, then this may be the actual trigger signal and then the time to the end of the MAC Header can be calculated. Having extracted the trigger time in block 1007, calculations of the packet duration and the wait time may be performed in block 1008. The wait time, Tw, is the time after the trigger time that shall elapse before the monitoring STA 860 transmits the ACK 820 as described with reference to FIG. 8.

Tw=L−2δ−Ttr+SIFS, where L is the packet duration, δ is the one way delay, Ttr is the trigger time and SIFS is aSIFSTime.

At time Tw after the trigger time Ttr, the monitoring STA 860 may transmit the ACK, at block 1009. It is not necessary for the monitoring STA 860 to receive the complete retry packet as it has already been received correctly as checked in block 1003. Hence, the monitoring STA 860 may stop receiving the packet, switch to transmit mode and send the ACK, or may use a separate transmit path to send the ACK.

Figure 11:
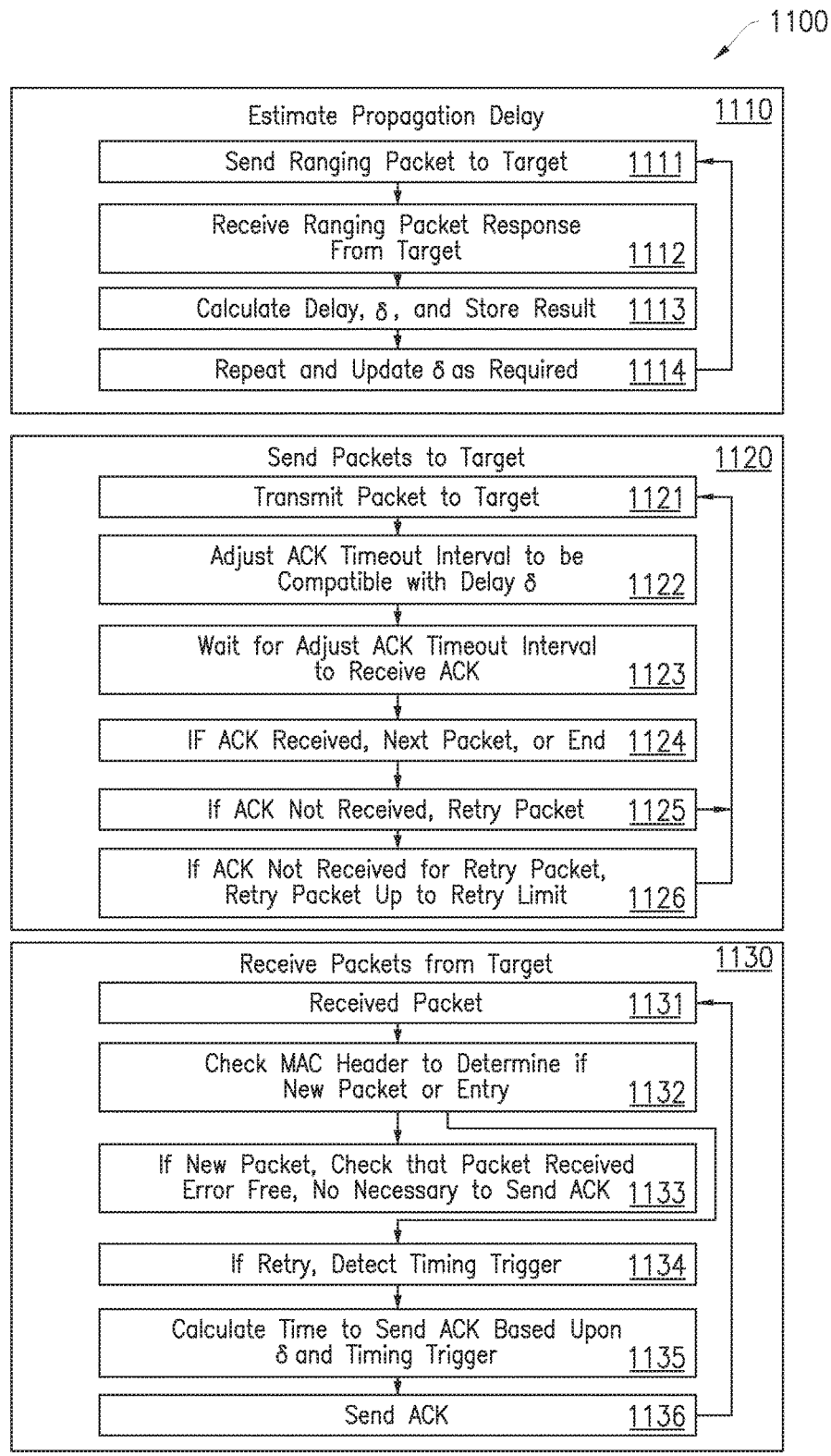
FIG. 11 is a flow diagram illustrating the sending and reception of data packets and the estimation of the propagation delay by a monitoring station according to an embodiment of the present disclosure.

FIG. 11 illustrates method 1100 according to an embodiment of the disclosure as used by the monitoring STA 860 when the delay between the monitoring STA 860 and the target STA or AP 850 exceeds the limit where the standard ACKTimeout interval will timeout before any ACKs will be received. Method 1100 may include block 1110 where the propagation delay for signals sent to or received from the target, which may be an AP or a STA, is estimated. Block 1110 may start with block 1111 where the monitoring STA 860 sends a ranging packet to the target. This ranging packet may be any packet where the turnaround time of the expected response is known. For example, the ranging packet may be an RTS packet, or a data null packet where the CTS or ACK response, respectively, turnaround time should be aSIFSTime. Block 1111 may be followed by block 1112 where the monitoring STA 860 receives the response. Block 1112 may be followed by block 1113 where, as previously described in FIG. 5 and FIG. 6, the propagation delay δ is estimated based upon the received time of the response at the monitoring STA 860 and, in some embodiments, the results stored. Block 1113 may be followed by block 1114 where the decision to repeat the estimation of the delay is made. The decision to repeat the delay estimation may be based upon the movement of the monitoring STA 860. For example, if the monitoring STA 860 is on a moving platform, then block 1110 may be repeated at a regular period commensurate with the change in range. It may be that repeating block 1110 may result in a location for the target being calculated, and in this case, if the position of the monitoring STA 860 is also known, then the range to the target, and hence the delay, may be calculated and the estimation block 1110 need not be repeated.

Method 1100 may include block 1120 where the monitoring STA 860 transmits packets to the target. Block 1120 may include block 1121 where the monitoring STA 860 transmits a packet to the target. Block 1120 may be followed by block 1122 where the monitoring STA adjusts the ACKTimeout interval to be used for the expected return ACK such that it accounts for the expected delay δ. For example, the ACKTimeout interval may be increased by a value of 2δ to account for the delay. Hence, in block 1123, the monitoring STA 860 may wait for the adjusted ACKTimeout interval in order to receive the expected ACK. The calculation of the adjusted ACKTimeout interval may take place every time that the value for the delay δ is updated in block 1113. If the ACK is received, then in block 1124 the monitoring STA 860 may either send another packet by returning to block 1121, or end. If, in block 1125, the expected ACK is not received within the adjusted ACKTimeout interval, then the monitoring STA 860 may assume that the packet failed and hence transmit a retry packet. If subsequent transmitted packets also do not result in an ACK being received within the adjusted ACKTimeout interval, then in block 1126, the monitoring STA 860 may retry the packet up to a retry limit. This retry limit may be the same or may be higher than the limit that is normally used.

Method 1100 may include block 1130 where the monitoring STA 860 receives packets from the target. Block 1130 may start with block 1131 where a packet is received. Block 1131 may be followed by block 1132 where the received packet MAC header is checked to determine if the received packet is a new packet or a retried packet. If it is determined in block 1132 that the received packet is a new packet, or indeed a retry packet of a packet that has previously not been received error free, then the complete packet may be received and checked to ensure it is error free. This may be determined by checking the FCS field at the end of the packet. It is not necessary to send an ACK response because, in the case under consideration, the delay δ is too large in that the standard ACKTimeout interval that will be in use at the target will time out before the ACK may be received. If in block 1132 it is determined that this received packet is a retry, and it is the retry of a packet that has previously been received error free, then block 1132 may be followed by block 1134 where the timing trigger is detected as previously described with reference to FIG. 8. Block 1134 may be followed by block 1135 where the time to send the ACK response is calculated, again as described with reference to FIG. 8 and FIG. 10 block 1008. Block 1135 may be followed by block 1136 where the ACK is transmitted at the time determined by the calculation in block 1135. The method may then return to block 1131 to await the next packet.

The presence or the ability to access an actual trigger signal from a receiver may vary between different implementations. For example, it may be possible to determine the time when CCA is exerted, but not the end of the MAC Header. In such cases, a variation to the above description may be that the CCA trigger signal is used and the ACK transmission time based on that. In this case, it may not be known that the received packet is indeed the expected retry packet, but the consequences are that the packet would be retried again if ACKs collide. At the end of the received packet, the receiver will know if the packet was the expected retry, and if not, the receiver awaits another packet until the retry is received.

Figure 12:
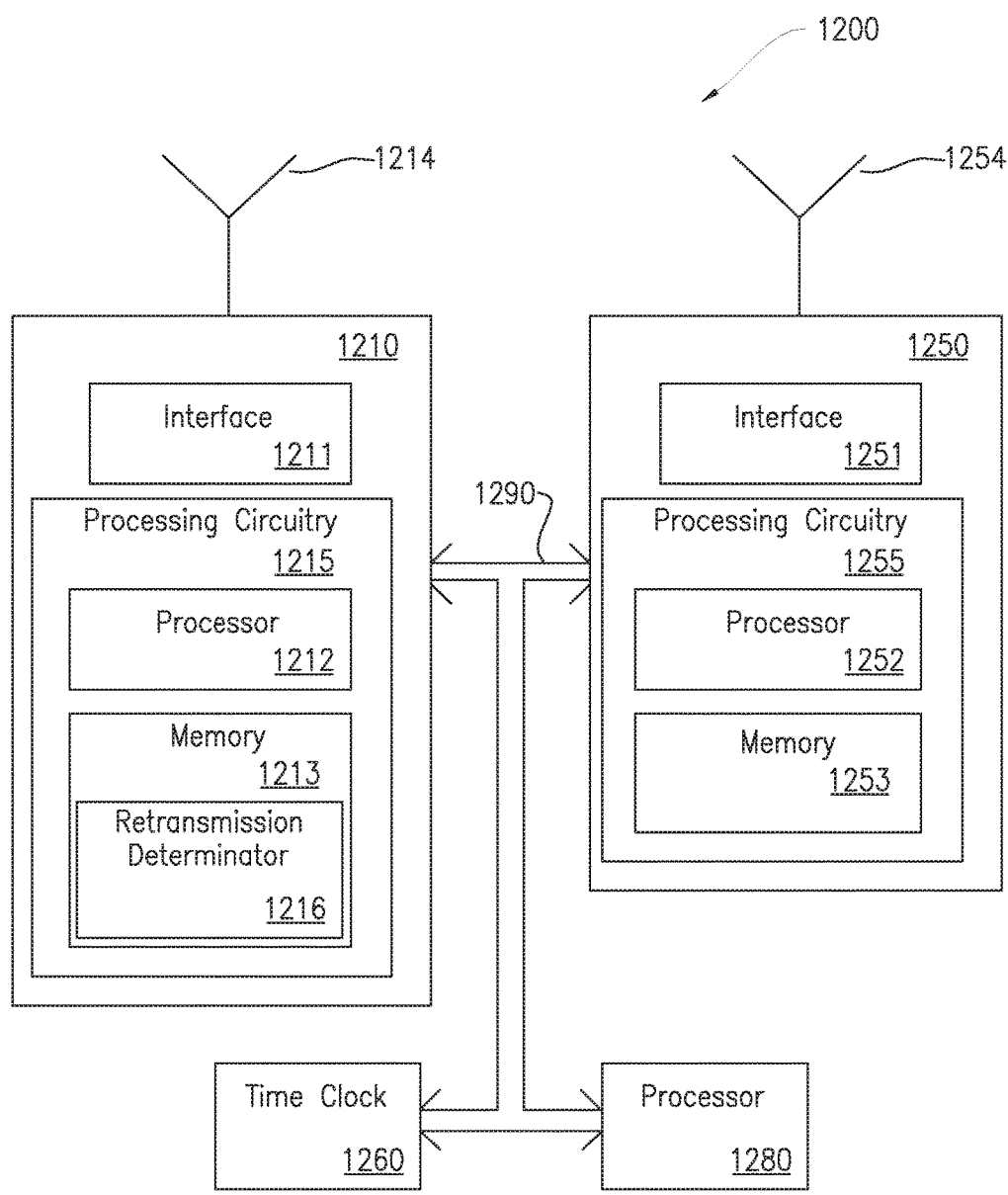
FIG. 12 is a block diagram of a wireless communications device according to an embodiment of the present disclosure.

A wireless communication device 1200 which according to an embodiment of the disclosure may be used as the monitoring station is described with reference to FIG. 12.

The wireless communication device, i.e., monitoring station, 1200 may be any device capable of wirelessly receiving signals and transmitting signals and can execute any of the methods illustrated in the specification. Wireless communication device 1200 may be one or more stations or access points, and the like. Wireless communication device 1200 may be one or more wireless devices that are based upon the IEEE 802.11 specification. The wireless communication device 1200 may include a wireless station 1210 and a wireless station 1250. In one embodiment, the wireless station 1210 may be used as a receiver and wireless station 1250 may be used as a transmitter or vice versa. In another embodiment, wireless station 1210 may be used as a transmitter and a receiver and wireless station 1250 not used, or vice versa. In another embodiment, both wireless stations 1210 and 1250 may be used as transmitters and receivers. It will be appreciated by persons skilled in the art that various combinations of transmitter and receiver may be used. The embodiment to be described herein is that where wireless station 1210 is used as a transmitter/receiver and station 1250 is used as a transmitter.

The wireless communication device 1200 may also include a time clock 1260 and a processor 1280 which are interconnected to the two wireless communication stations 1210 and 1250 by a data bus 1290.

Station 1210 includes interface 1211, one or more wireless antennas such as wireless antennas 1214 and processing circuitry 1215. Processing circuitry includes processor 1212 and memory 1213. In addition to a traditional processor and memory, processing circuitry 1215 may comprise integrated circuitry for processing and/or control, e.g., one or more processors and/or processor cores and/or FPGAs (Field Programmable Gate Array) and/or ASICs (Application Specific Integrated Circuitry). Processing circuitry 1215 may comprise and/or be connected to and/or be configured for accessing (e.g., writing to and/or reading from) memory 1213, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1213 may be configured to store code executable by control circuitry and/or other data, e.g., data pertaining to communication, e.g., configuration and/or address data of nodes, etc. Processing circuitry 1215 may be configured to control any of the methods described herein and/or to cause such methods to be performed.

The interface 1211 may include an analog and/or digital front end plus the baseband and MAC elements of a receiver. The interface 1211 and/or the processor 1212 may include elements for measuring and/or calculating attributes of received signals (input signals). Memory 1213 stores instructions that, when executed, configure the processor 1212 to monitor communications such as communications between a monitoring station and a wireless device. Interface 1211 is configured to receive a first data packet and a subsequent data packet from the wireless device. Via retransmission determinator 1216, processor 1212 is configured to determine that receipt of a first data packet from the wireless device has been received without error and determine that a subsequent data packet being received from the wireless device is a retransmission of the first data packet. Interface 1251 is configured to transmit a first acknowledgement to the wireless device before the subsequent data packet is received in its entirety.

Station 1250 may include interface 1251, one or more wireless antennas such as wireless antennas 1254, and processing circuitry 1255. Processing circuitry 1255 includes processor 1252 and memory 1253. In addition to a traditional processor and memory, processing circuitry 1255 may comprise integrated circuitry for processing and/or control, e.g., one or more processors and/or processor cores and/or FPGAs (Field Programmable Gate Array) and/or ASICs (Application Specific Integrated Circuitry). Processing circuitry 1255 may comprise and/or be connected to and/or be configured for accessing (e.g., writing to and/or reading from) memory 1253, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1253 may be configured to store code executable by control circuitry and/or other data, e.g., data pertaining to communication, e.g., configuration and/or address data of nodes, etc. Processing circuitry 1255 may be configured to control any of the methods described herein and/or to cause such methods to be performed.

The interface 1251 may be a wireless transmitter. It may include, for example, at least a part of an analog and/or digital front end of a transmitter. The interface 1251 and/or the processor 1252 may include elements for processing management, data and control packets for transmission via the antenna 1254. The interface 1251 and/or the processor 1252 may include elements for the transmission of packets via antenna 1254.

According to this embodiment of the disclosure, the interface 1211 is arranged to receive input signals and the processor 1212 is arranged to measure and monitor an input signal's attributes, including but not limited to the preamble and MAC header according to the IEEE 802.11 standard. Also, the interface 1211 is arranged to receive input signals and the processor 1212 is arranged to measure and monitor an input signal's attributes, including data and control packets transmitted by an access point or station that is based upon the IEEE 802.11. Such control packets include ACK and CTS packets. The memory 1213 may store instructions for executing any method mentioned in the present disclosure, input signals, and results of processing of the processor 1212, signals to be outputted and the like.

According to an embodiment of the disclosure, the interface 1251 is arranged to transmit signals and the processor 1252 is arranged to prepare the transmitted signal attributes based upon the IEEE 802.11 standard. Such transmitted packets include control packets based upon the IEEE 802.11 standard. Such control packets include ACK packets. The memory module 1253 may store instructions for executing any method mentioned in the present disclosure, input signals, and results of processing of the processor 1212, signals to be outputted and the like.

According to an embodiment of the disclosure, the interface 1211 is arranged to receive transmissions of another wireless communication device and, together with the processor 1212, is arranged to monitor an attribute of the received transmissions of the other wireless communication device, and determine the attributes of the preamble header and MAC header. In addition, according to an embodiment of the disclosure, the interface 1211 is arranged to measure the time of arrival of the received transmissions of the other wireless device. In addition, according to an embodiment of the disclosure, the interface 1211 is arranged to measure the specific times of the reception of the MAC header of transmissions from the wireless station 1250. These times may be accomplished by outputting the value of the TSF timer of the wireless communication device 1210 at the point where the MAC header is detected. This may also be accomplished by outputting a trigger that is timed to coincide with the reception of the MAC header from the other wireless device. This trigger may then be used to read the time from the time clock 1260. Time clock 1260 may have a precision that is higher than the internal TSF timer that is part of the wireless communications device 1210. Processor 1212 together with memory 1213 may process the information within the MAC header so as to determine the attributes of the received packet.

According to an embodiment of the disclosure, the interface 1251 may be arranged to transmit packets to another wireless communication device and the processor 1252 may be arranged to prepare the attributes of the packet to be transmitted.

According to an embodiment of the disclosure, processor 1280 may be used to control the operations of the monitoring station 1200 and in particular the two wireless stations 1210 and 1250. Processor 1280 may also carry out the various calculations as described in this disclosure and may also prepare the measurement results for disclosure to an operator or user.

In a further embodiment of this disclosure, the wireless device 1200 may include additional wireless devices that are used as receivers. Some or all of these receivers may then be used to identify the correct retry packet in the case that the reception is such that many packets are being received from other networks and devices. The chance that the wanted packet is received and detected from among a multitude of packets is enhanced by using more receivers.

Figure 13:
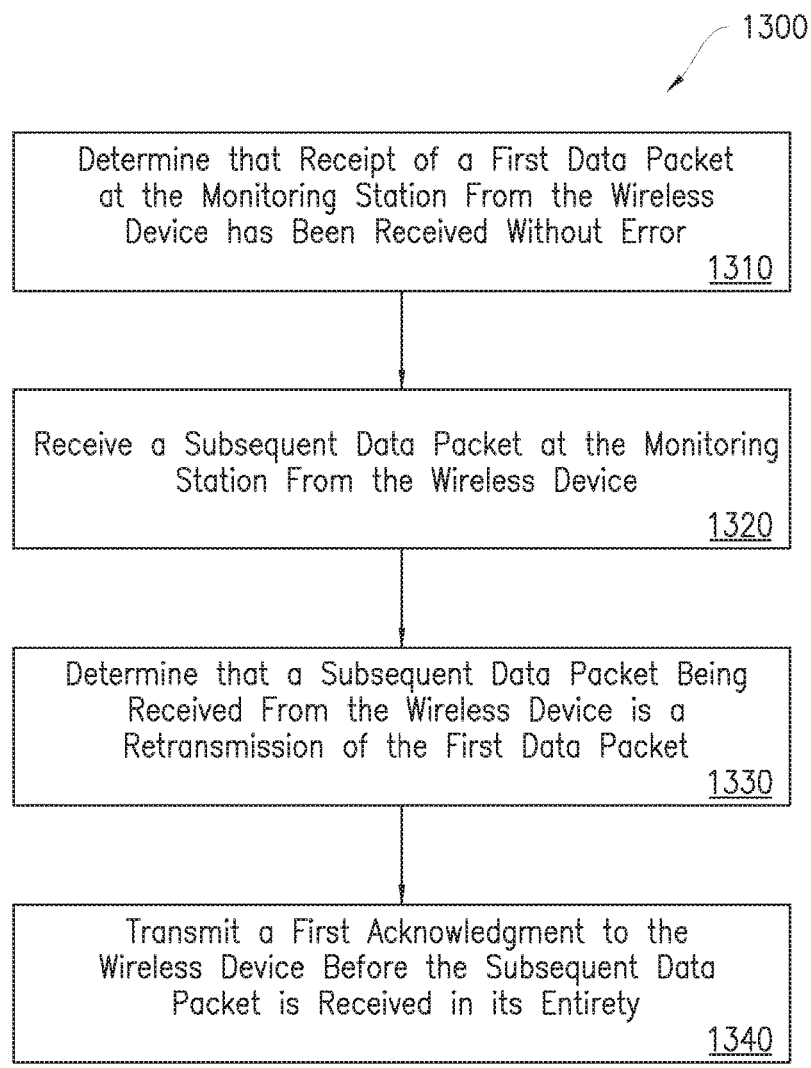
FIG. 13 is a flow diagram illustrating an exemplary process performed by a wireless communications device according to an embodiment of the present disclosure.

FIG. 13 illustrates a method (1300) for long range communication between a monitoring station, i.e., monitoring station 1210 and a wireless device according to an embodiment of the present disclosure. Initially, processor 1212 of monitoring station 1210 is configured to determine that receipt of a first data packet is received from the wireless device without error (step 1310). Interface 1211 is configured to receive a subsequent data packet at the monitoring station from the wireless device (step 1320). Processor 1212 or retransmission determinator 1216 is configured to determine that the subsequent data packet being received from the wireless device is a retransmission of the first data packet (step 1330). Interface 1211 transmits a first acknowledgment to the wireless device before the subsequent data packet is received in its entirety (step 1340).

In one embodiment, determining that the subsequent data packet being received from the wireless device is a retransmission of the first data packet includes checking a media access control (MAC) header of the received first data packet. In another embodiment, determining that the first data packet was received from the wireless device without error includes checking a field of the data packet. In another embodiment, the field that is checked is the frame check sum (FCS) field. In another embodiment, processor 1212 may be further configured to determine a time of reception of a field of the subsequent data packet, determine a trigger time based on the time of reception of a field of the subsequent data packet, and determine a time interval before transmitting a first acknowledgement, the time interval based upon the trigger time. Interface 1211 may be configured to transmit the first acknowledgement to the wireless device after the time interval has elapsed and before the subsequent data packet is received in its entirety. In another embodiment, processor 1212 of the monitoring station is further is further configured to stop receipt of the subsequent data packet from the wireless device. In another embodiment, interface 1211 is further configured to transmit a ranging packet from the monitoring device to the wireless device, and receive a ranging packet response from the wireless device. Processor 1212 is further configured to estimate a propagation delay based upon a time the ranging packet response was received. In another embodiment, the trigger time is further based upon the propagation delay. In another embodiment, the wireless device is an access point (AP). In another embodiment, the wireless device is a second monitoring station.

In another embodiment, a method for long range communications between a monitoring station, i.e. monitoring station 1210 and a wireless device is provided. Processor 1212 is configured to determine that receipt of a first data packet from the wireless device has been received without error. Processor 1212 or retransmission determination module 1216 is configured to determine that a subsequent data packet being received from the wireless device is a retransmission of the first data packet by checking a media access control (MAC) header of the received first data packet.

Processor 1212 is configured to determine a time of reception of a field of the subsequent data packet to determine a trigger time, and determine a time interval before transmitting a first acknowledgement, the time interval based upon the trigger time. Interface 1211 is configured to transmit the first acknowledgement to the wireless device after the time interval has elapsed and before the subsequent data packet is received in its entirety.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (which when programmed as described herein forms a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++.

However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the use of other specific points within the received packet as the timing trigger, the use of one or more wireless devices to process the delay, the use of one or more wireless devices to transmit the ACK that is sent before the received packet has completed, the calculation and value of the adjusted ACKTimeout interval based upon the measured or estimated delay, the method of estimating the delay. Accordingly the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method for communications between a monitoring station and a wireless device, the method comprising:
    determining that a first data packet has been received at the monitoring station from the wireless device without error;
    determining that a subsequent data packet is being received at the monitoring station from the wireless device;
    determining that the subsequent data packet being received from the wireless device is a retransmission of the first data packet;
    determining a time of reception of a field of the subsequent data packet;
    determining a trigger time based on the determined time of reception of the field of the subsequent data packet;
    determining a time interval before transmitting a first acknowledgement, the time interval based upon the trigger time; and
    transmitting a first acknowledgement to the wireless device after the time interval has elapsed and before the subsequent data packet is received in its entirety.

2. The method of claim 1, wherein determining that the subsequent data packet being received from the wireless device is a retransmission of the first data packet comprises checking a media access control (MAC) header of the received first data packet.

3. The method of claim 1, wherein determining that the first data packet was received from the wireless device without error comprises checking a field of the data packet.

4. The method of claim 3, wherein the field is the frame check sum (FCS) field.

5. The method of claim 1, further comprising:
    transmitting a ranging packet from the monitoring station to the wireless device;
    receiving a ranging packet response from the wireless device; and
    estimating a propagation delay based upon a time the ranging packet response was received.

6. The method of claim 5, wherein the trigger time is further based upon at least one of the clear channel assessment (CCA) and the propagation delay.

7. The method of claim 1, further comprising the monitoring station stopping receipt of the subsequent data packet from the wireless device.

8. The method of claim 1, wherein the wireless device is an access point (AP).

9. A method for communications between a monitoring station and a wireless device, the method comprising:
    determining that a first data packet has been received at the monitoring station from the wireless device without error;
    determining that a subsequent data packet is being received at the monitoring station from the wireless device;
    determining that the subsequent data packet being received from the wireless device is a retransmission of the first data packet by checking a media access control (MAC) header of the received first data packet;
    determining a time of reception of a field of the subsequent data packet;
    determining a trigger time based on the determined time of reception of the field of the subsequent data packet;
    determining a time interval before transmitting a first acknowledgement, the time interval based upon the trigger time; and
    transmitting the first acknowledgement to the wireless device after the time interval has elapsed and before the subsequent data packet is received in its entirety.

10. A monitoring station for communications with a wireless device, the monitoring station comprising:
    an interface configured to:
        receive a first data packet from the wireless device; and
        receive a subsequent data packet at the monitoring station from the wireless device; and
    processing circuitry comprising:
        a processor; and
        a memory storing instructions that, when executed, configure the processor to:
            determine that the first data packet from the wireless device has been received without error; and
            determine that the subsequent data packet being received from the wireless device is a retransmission of the first data packet;
            determine a time of reception of a field of the subsequent data packet;
            determine a trigger time based on the determined time of reception of the field of the subsequent data packet;
            determine a time interval before transmitting a first acknowledgement, the time interval based upon the trigger time; and
    the interface further configured to transmit a first acknowledgement to the wireless device after the time interval has elapsed and before the subsequent data packet is received in its entirety.

11. The monitoring station of claim 10, wherein determining that the subsequent data packet being received from the wireless device is a retransmission of the first data packet further comprises checking a media access control (MAC) header of the received first data packet.

12. The monitoring station of claim 10, wherein determining that the first data packet was received from the wireless device without error further comprises checking a field of the data packet.

13. The monitoring station of claim 12, wherein the field is the frame check sum (FCS) field.

14. The monitoring station of claim 10, wherein the interface is further configured to:
   transmit a ranging packet to the wireless device; and
   receive a ranging packet response from the wireless device,
   wherein the memory further stores instructions that, when executed, configure the processor to estimate a propagation delay based upon a time the ranging packet response was received.

15. The monitoring station of claim 14, wherein the trigger time is further based upon at least one of a clear channel assessment (CCA) and the propagation delay.

16. The monitoring station of claim 10, wherein the memory further stores instructions that, when executed, configure the processor to stop receipt of the subsequent data packet from the wireless device.

17. The monitoring station of claim 10, wherein the wireless device is an access point (AP).

18. The monitoring station of claim 10, wherein the wireless device is a second monitoring station.

* * * * *